J. H. DE HART.
DIRIGIBLE HEADLIGHT.
APPLICATION FILED JAN. 26, 1918.
1,307,970.
Patented June 24, 1919.
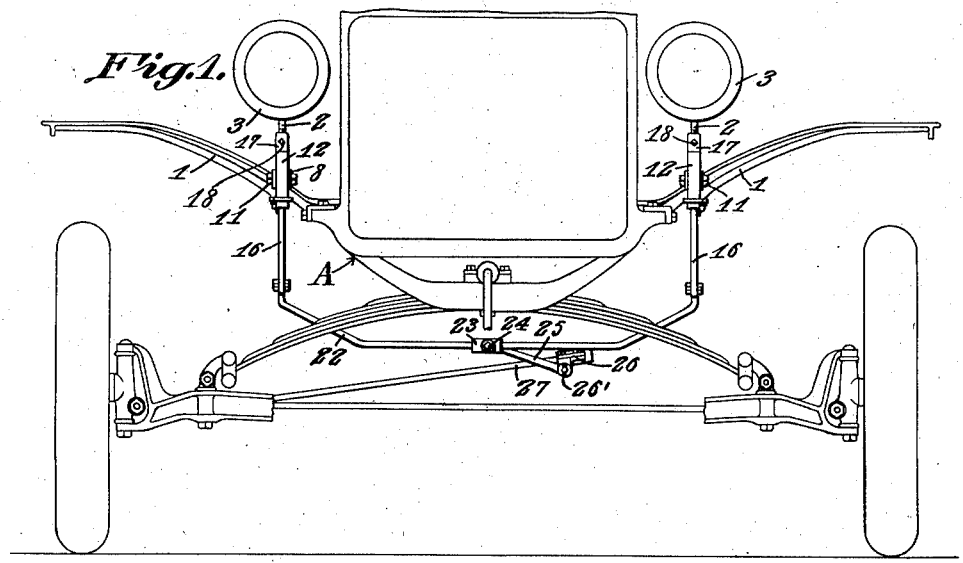
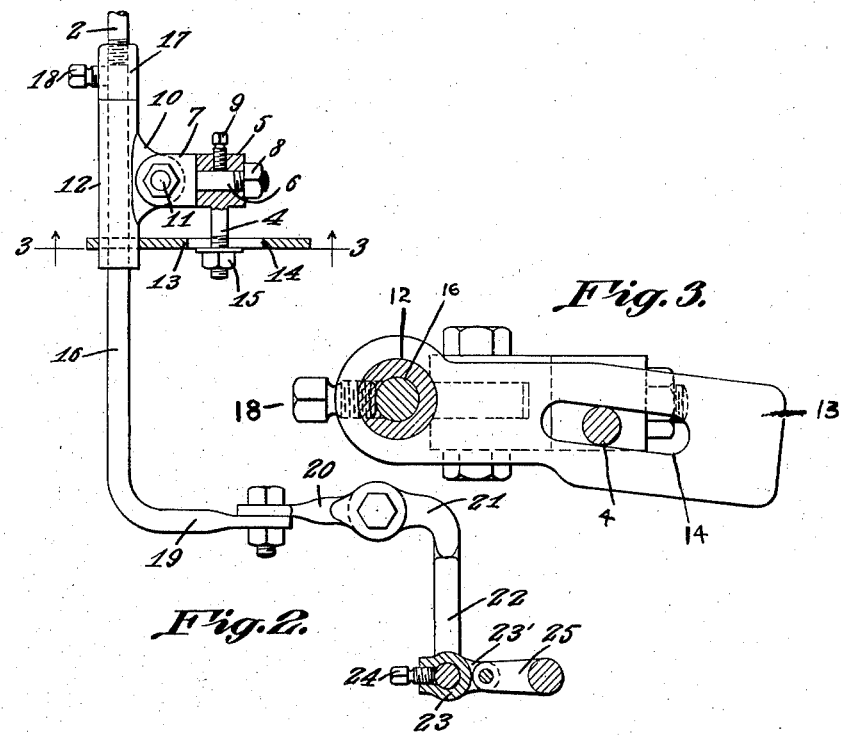
J. H. de Hart, Inventor

UNITED STATES PATENT OFFICE.

JOSEPH H. DE HART, OF WOOLWINE, VIRGINIA.

DIRIGIBLE HEADLIGHT.

1,307,970.

Specification of Letters Patent.

Patented June 24, 1919.

Application filed January 26, 1918. Serial No. 213,913.

*To all whom it may concern:*

Be it known that I, JOSEPH H. DE HART, a citizen of the United States, residing at Woolwine, in the county of Patrick and State of Virginia, have invented a new and useful Dirigible Headlight, of which the following is a specification.

This invention relates to a dirigible headlight constructed with especial reference to motor vehicles, the main object of the invention being to produce means operated automatically in conjunction with the steering mechanism of a vehicle of the class described, whereby the headlights are turned simultaneously with the steering wheels at the front of the machine for the purpose of directing the illuminating rays from the headlight upon that portion of the roadway about to be followed by the machine in accordance with the angle of the steering wheels.

One of the principal objects of the invention is to provide means for automatically directing the rays of light upon the roadway about to be traversed by the machine and adjacent the machine when the steering mechanism is thrown to shift the front or steering wheels.

Another object of the invention is the provision of means for adjusting the headlight.

A still further object of the invention is the provision of means for compensating for the changes in distance between the lamp connecting rod and the steering rod.

The invention also contemplates the production of a simple, durable and efficient dirigible headlight.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawing, wherein:—

Figure 1 is a front elevation of an automobile, portions being broken away, with the headlight mechanism constructed in accordance with the present invention attached thereto;

Fig. 2 is a view in elevation, partly in section of the light controlling and adjusting mechanism.

Fig. 3 is a sectional view taken on the line 3—3 of Fig. 2.

Referring to the drawing by numerals of reference:—

An automobile is indicated generally at A which is provided with the usual fender supports 1 extending laterally from the forward end thereof. These fender supports 1 are apertured to receive the stems or standards 2 of the head lamps 3, such structure being a well known one in use on a popular make of automobile.

In carrying out the present invention, the standard 2 of the lamp 3 is withdrawn from the aperture in the fender support 1, and a pin 4 which extends from an apertured block 5 is inserted in the aperture in the support 1. The block 5 is apertured to receive a pin or bolt 6 which extends from a bifurcated block 7 and which is threaded to receive a nut 8 by which the parts are bound together. The block 5 is tapped to receive a set-screw 9 which is adapted to engage the bolt 6 and clamp it and the bifurcated block 7 in any adjusted position.

An apertured ear 10 is pivoted on a pin 11 between the apertured prongs of the bifurcated block 7. The apertured ear 10 extends radially from a bearing sleeve 12 which is thus adjustable about the pin 11. As a means of adjusting the sleeve 12 about the pin 11 and securing the sleeve in its adjusted position, a plate 13 is provided which is apertured at its forward end to encircle the lower end of the sleeve 12. This plate 13 is slotted longitudinally, as at 14, to receive the depending end of the pin or bolt 4. When the nut 15, which is threaded on the lower end of the bolt 4, is loosened the plate 13 may be moved back and forth longitudinally to change the inclination of the bearing sleeve 12 and, when the sleeve has been set at the proper position, the nut 15 is screwed on the bolt 4 to clamp the plate 13 against the lower face of the support 1 and so hold the plate and sleeve in adjusted position.

A light standard or support 16 is oscillatable in the sleeve 12, and this standard is formed with a head 17 which is apertured and tapped to receive the threaded end of the stem 2 of the lamp 3 and which rests upon the upper end of the sleeve 12 and serves to retain the standard 16 in place therein. The head 17 is tapped radially to receive a set screw 18 which contacts the end of stem 2 and clamps the same in adjusted position.

The standard 16 merges at its lower end into a crank arm 19 the end of which has pivotal connection with a link 20, which link oscillates horizontally about the pivot. The other end of the link 20 oscilllates vertically about its pivotal connection with the forwardly bent end 21 of the upturned end of a connection rod 22 which rod extends between and is connected to the standards of both lamps for the purpose of constraining the lamps to turn in unison.

A sleeve 23 surrounds the rod 22 on which it is adjustable longitudinally, and the sleeve is tapped to receive a set screw 24 by which the sleeve may be clamped in adjusted position. The sleeve is formed with rearwardly extending lugs 23' between which the angled end of a connecting link 25 is pivotally secured. The other end of the link 25 has pivotal connection with the depending lug 26' of a clamping block 26 which is bound upon the steering rod 27 of the automobile.

As will be understood, the sleeves 12 are adjusted to normally incline forwardly and downwardly, and the lamps are set to throw their light a suitable distance ahead of the automobile, thus forming acute angles between the standards and lamps. When the standards 16 and lamps 3 are rocked or turned as the automobile is about to round a corner or bend in the road, the rays of light from the lamps will be directed downwardly upon the roadway adjacent to the automobile, because the lamps are oscillated about an axis which is inclined to the vertical.

Attention is also called to the fact that the connecting rod 22 will rock about its pivotal connection with the link 25 as the lamps are oscillated and, because of the forwardly extending ends 21 and the links 20, will compensate for the throw of the crank arms 19 and prevent straining of the connections, as would otherwise be the case.

Having thus described the invention, what is claimed as new and sought by Letters Patent, is:—

In a dirigible headlight, the combination with an automobile, of a bearing supported on a fender of the automobile, a plate mounted on the bearing and provided with an angularly disposed slot, an ear formed upon the bearing, a bifurcated member pivotally connected with the ear, a bolt carried thereby, a block adjustable on the bolt, a pin depending from the block and disposed in the angularly disposed slot and a lamp bracket rotatable in the bearing.

In testimony that I claim the foregoing as my own, I have hereto affixed my signature in the presence of two witnesses.

JOSEPH H. DE HART.

Witnesses:
  IVY E. SIMPSON,
  WM. N. ROACH, Jr.